Figure 1:
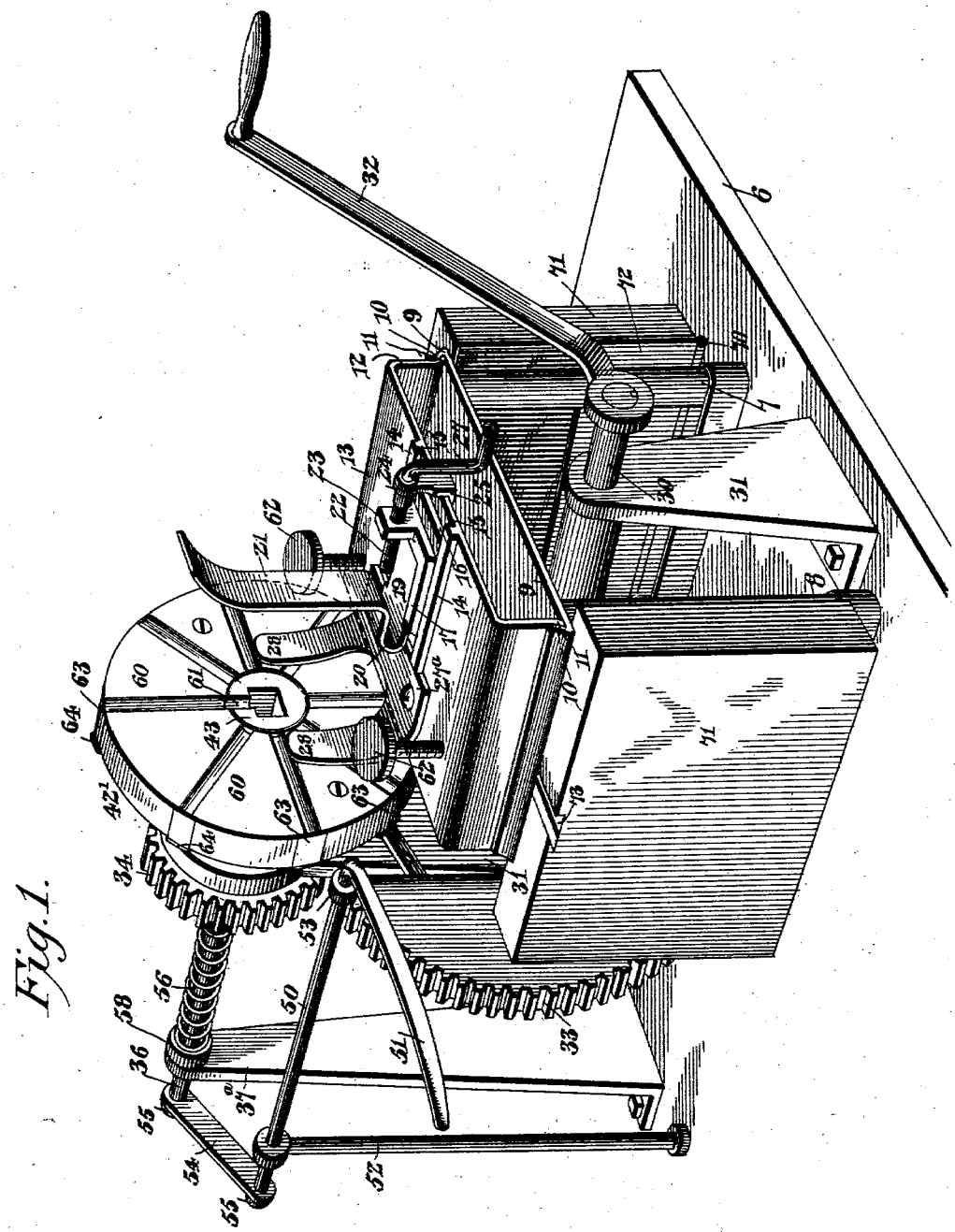

No. 634,027. Patented Oct. 3, 1899.
J. C. POE.
NUT SETTING MACHINE.
(Application filed June 28, 1899.)

(No Model.) 2 Sheets—Sheet 1.

Witnesses
Jas. K. McCuthran
Geo. H. Chandler

James C. Poe Inventor
By his Attorneys,
C. A. Snow & Co.

THE NORRIS PETERS CO., PHOTO-LITHO., WASHINGTON, D. C.

No. 634,027. Patented Oct. 3, 1899.
J. C. POE.
NUT SETTING MACHINE.
(Application filed June 28, 1899.)
(No Model.) 2 Sheets—Sheet 2.
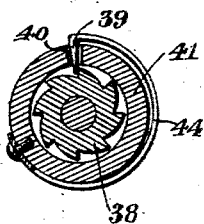
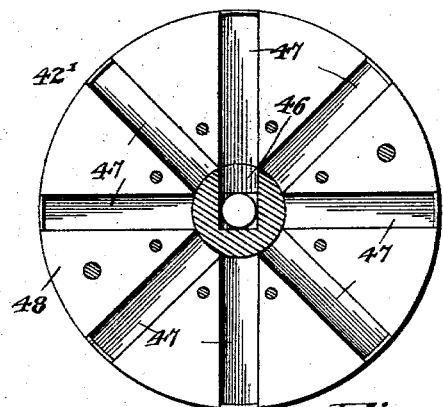
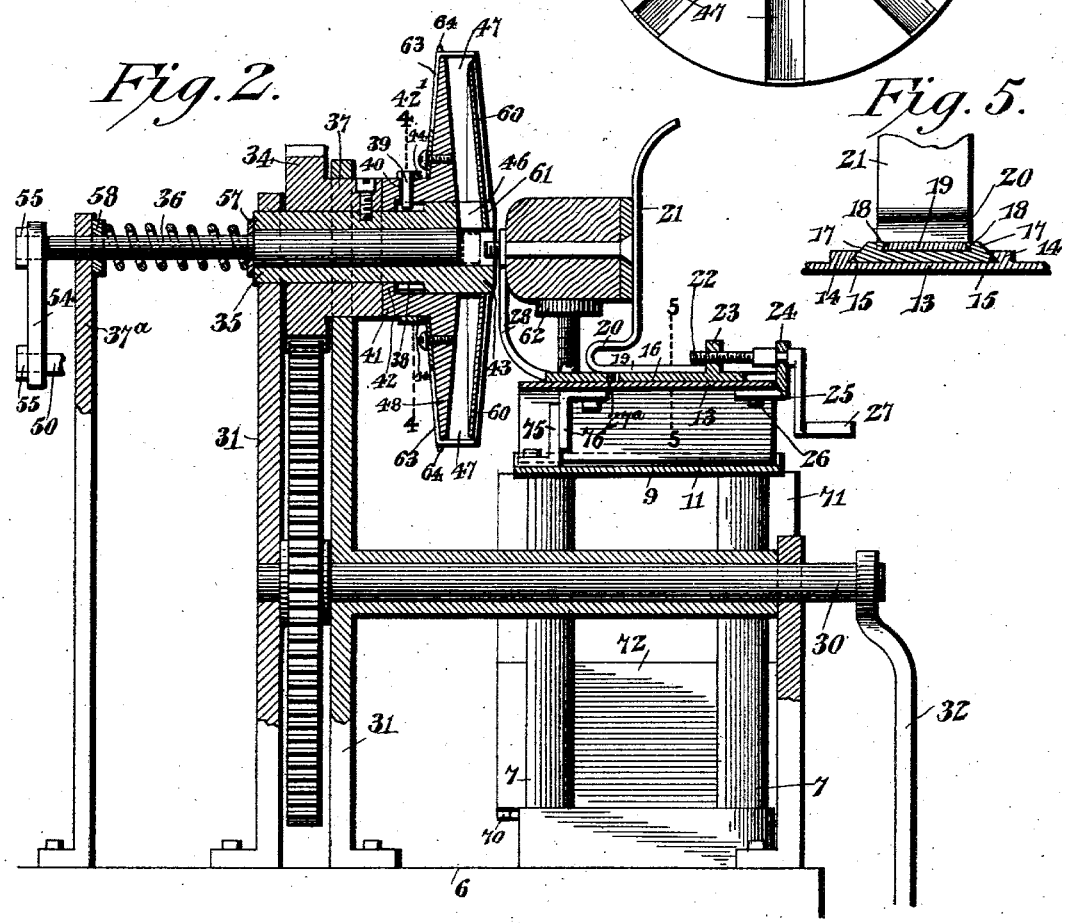
Witnesses
Jas. K. M°Cathran
Geo. H. Chandlee
James C. Poe Inventor
By his Attorneys,
C. A. Snow & Co.

UNITED STATES PATENT OFFICE.

JAMES C. POE, OF SPRINGFIELD, MISSOURI.

NUT-SETTING MACHINE.

SPECIFICATION forming part of Letters Patent No. 634,027, dated October 3, 1899.

Application filed June 28, 1899. Serial No. 722,160. (No model.)

*To all whom it may concern:*

Be it known that I, JAMES C. POE, a citizen of the United States, residing at Springfield, in the county of Greene and State of Missouri, have invented a new and useful Nut-Setting Machine, of which the following is a specification.

This invention relates to means for placing and screwing up nuts upon bolts or other threaded bodies, and particularly to that class of machines adapted for setting and turning up the nuts of tire-bolts, the object of the invention being to provide a simple and effective machine adapted to be fastened to any form of table which will receive a wheel and with which a series of nuts may be successively and automatically brought into operative position, then placed upon a bolt, and finally screwed up into their final positions.

A further object of my invention is to provide a simple and effective means for holding the tire and rim of the wheel in the proper positions with relation to the nut-carrying head and also for holding and delivering the nuts in a position to be operated upon.

In the drawings forming a portion of this specification and in which like numerals of reference designate corresponding parts in the several views, Figure 1 is a perspective view of my machine ready for operation. Fig. 2 is a longitudinal section of the machine, showing the wheel-rim and tire with a bolt in position for operation. Fig. 3 is a front view of the nut-carrying head with its cover removed. Fig. 4 is a section on line 4 4 of Fig. 2, showing the ratchet connection with the nut-carrying head and its shaft. Fig. 5 is a section on line 5 5 of Fig. 2, looking to the left.

Referring now to the drawings, 6 represents a base of any suitable material, upon which are fixed uprights 7 and 8, supporting a table 9, having at its side edges upwardly and inwardly extending flanges 10, adapted to receive and hold the outwardly-turned edges 11 of the downwardly-extending ends 12 of a carrying-plate 13. Upon the plate 13 and in the direction of movement of said plate are formed two ribs 14, having their adjacent faces beveled downwardly, as shown at 15, to receive the corresponding edges of a plate 16. This plate 16 has upon its upper face guideways 17, having their adjacent faces beveled, as shown at 18 in Fig. 5, adapted to receive the correspondingly-formed edges of a plate 19, which has a forwardly and then upwardly and rearwardly extending portion 20, terminating in an upwardly and rearwardly extending spring-clip 21, for a purpose which will be presently described. The plate 19 is held frictionally in its guideways in the plate 16, and the plate 16 is moved along the ribs 14 through the medium of a screw 22, passed through a threaded perforation in a lug 23, extending upwardly from the plate 16, and which screw 22 has a revoluble bearing 24 in a lug 25, extending above the surface of the carrying-plate, said lug having its lower end extended and in contact with the under surface of the carrying-plate 13, with which it is engaged by means of a screw 26, although this lug may be formed integral with the plate 13, if desired. The screw 22 has a crank 27 at its rear end, through the medium of which said screw may be rotated to adjust the plate 16 and the parts carried thereby.

The upwardly-extending portion 21 of the plate 16 is adapted to have a clamping action in connection with a plate 27$^a$, secured to the upper face of plate 13 and having upwardly and forwardly extending fingers 28, which fingers lie at each side of an axial opening through a nut-carrying head, which will be presently described. The plate 13 is intended to be manually adjusted with respect to the table 9.

Passing beneath the table 9 and in vertical alinement with the screw 22 is a shaft 30, journaled in bearings in an upright 31 at the forward edge of the base 6 and in parallel uprights 31 in the rear thereof. The outer end of this shaft is provided with an operating-crank 32, and adjacent its rear end and intermediate the uprights 31 is arranged upon the shaft 30 a gear-wheel 33, meshing with a pinion 34, fixed to a sleeve 35, rotatably mounted upon a shaft 36, having a bearing in an upright 37$^a$, secured to the base 6. The pinion 34 has a laterally-extending cylindrical portion 37, which fits in a bearing in an upright 31 at one side of the pinion.

The sleeve 35 has a ratchet-wheel 38 adjacent to its forward end, which is adapted to be engaged by a pawl 39 in the form of a pin extending outwardly through a perforation 40 in the hub 41 of a nut-carrying head 42', which nut-carrying head is slipped over the sleeve 35 from its rear end and has an inwardly-directed annular flange 42, which engages the adjacent face of the ratchet-wheel 38 to prevent outward movement of the head with respect to the sleeve. The outer end of the sleeve 35, as shown at 43, is enlarged in exterior diameter and fits snugly within a radial opening in the nut-carrying head. The nut-carrying head is held normally fixedly to the sleeve 35 by means of a pawl 39, which is held in engagement with the ratchet-wheel 38 by means of a spring-band 44, having its free end connected with said pawl and with its opposite end fixed to the hub of the head 42'. Opening into the bore of the sleeve 35 is a radial perforation 46, adjacent to the forward end of said sleeve, and which perforation is adapted to successively aline with radial slots 47, formed in the space of the nut-carrying head 42'. Thus if the slots 47 contain each a series of nuts and said head be rotated with respect to the sleeve the nuts of each slot may be caused to successively drop into the bore of the sleeve and into the position shown in dotted lines in Fig. 2, the dropping of the nuts from each slot being accomplished by removing the preceding nut from the bore of the sleeve and then bringing the head 42' into such a position that its radial slot 47, which is at that time in alinement with the similar slot 46 of the sleeve, is in a vertical or an approximately vertical position. In order to discharge the nuts from the bore of the sleeve, that portion of the shaft 36 lying within the sleeve forms a plunger which is adapted to be reciprocated by a pull-bar 50, having at its forward end a laterally-extending handle 51, and which bar is slidably mounted in a standard 52 adjacent its rear end and in a projection 53 of one of the standards 31. The rear ends of the bar 50 and shaft 36 are connected by means of a cross-piece 54, held in place by means of nuts 55, said shaft 36 and its plunger being returned rearwardly to its normal position by means of a helical spring 56, encircling the shaft 36 and bearing at one end upon a loose washer 57, lying upon the rear end of the sleeve 35, and at its opposite end against a second washer 58, fixed to the shaft 36. As will be seen from the foregoing description, when it is desired to rotate the nut-carrying head upon the sleeve 35 it is only necessary to shift the pawl 39 over the face of the ratchet-wheel 38. This is readily accomplished by holding the pinion 30 to prevent rotation of the sleeve 35 and then rotating the said head to cause the pawl to rise and pass successively over the teeth of the ratchet.

The face of the nut-carrying head is provided with a cover 60, having a central perforation adapted to receive and fit closely upon the forward end of the sleeve 35, said cover having a series of radial grooves corresponding in location and arrangement to the radial slots 47 in the head, which said grooves are adapted to successively aline with a single radial groove 61 in the front end face of the sleeve 35 and which is in alinement with the perforation 46 in the sleeve. Thus whenever one of the grooves in the face of the said cover is in alinement with the groove 61 in the end of the sleeve 35 it will be known that its corresponding slot 47 is in alinement with the perforation 46 in the sleeve and in a position to deliver its nuts to the sleeve.

Referring now more particularly to Fig. 2 of the drawings, the operation of my invention is as follows: A wheel is adjusted to allow the nut-carrying head to lie between two of the spokes thereof and with the rim and tire of the wheel intermediate the upwardly-projecting portion 21 of plate 19 and the fingers 28, said rim and tire being supported upon vertically-adjustable rests consisting of thumb-screws 62, engaging threaded perforations in the plate 13, these thumb-screws being adjusted to that position where they hold the wheel, with its bolts, successively in axial alinement with the bore of the sleeve 35. In order to hold the wheel tightly between the clamp 21 and fingers 28 and resting upon the thumb-screw 62, the screw 22 is manipulated. One of the slots 47 is then brought into alinement with the perforation 46 of the sleeve and into a vertical position, when one of the nuts from said slot will drop into the bore of the sleeve and into the position shown in dotted lines in Fig. 2. The handle 51 is then operated to throw the shaft 36 and its plunger forwardly, causing said plunger to engage the nut and push it up against the end of the tire-bolt, the operator pressing at the same time against the opposite edge of the wheel-rim. By then turning the crank 32 the nut-carrying head is caused to rotate through the medium of the pinion 34 and sleeve 35, effecting a screwing of the nut upon the end of the bolt, it being understood, of course, that the perforation 46 and the outer end of the bore of the sleeve are angular in cross-section, said outer portion of the bore having such shape and dimensions as to receive snugly the nut and hold it against independent rotation with respect thereto. When the nut is screwed home, it has passed from beneath the next succeeding nut, which latter then drops down into the sleeve and is ready for engagement by the plunger end of the shaft 36 to force it against and hold it while it is being started upon its next succeeding bolt. It is of course understood that after the nut is once started upon the bolt there is no necessity for retaining the plunger in its forward position, the passing of the nut onto the bolt effecting the withdrawal of the latter outwardly of the sleeve. This operation is repeated so long as there remain nuts in the slot, after which the pinion 34 is held against rotation to hold the sleeve 35, and the head is rotated to move the pawl over the ratchet-disk a suitable distance to cause alinement of the next succeeding nut-carrying slot with the radial perforation in the sleeve.

To enable a refilling of the slots 47 without the removal of the cover 60, I attach to the rear of the nut-carrying head a series of radially-extending spring-plates 63, having their extremities turned laterally to cover the ends of the slots 47, said laterally-extending portions having shoulders 64, adapted to receive a tool or the finger of the operator to move these extensions from the ends of the slots when the nuts are to be inserted.

Hingedly connected with the uprights 7 and 8, as shown at 70, are boxes 71 having their inner faces open at their upper halves, the lower halves thereof having closures 72. These boxes are held folded against the sides of the uprights by means of spring-clips 73, beneath which the boxes pass when they are raised into their vertical position, as shown in the drawings. When the spring-clips 73 are released, the boxes may be caused to lie horizontally, and thus enable their contents to be easily and quickly removed. These boxes are adapted for the reception of bolts and nuts, as also of any other parts to be used in connection with the machine. It will be readily understood that by manipulation of the screw 22 I may adjust the wheel-clamp, comprising elements 21 and 28, for the reception of the rims of wheels of various thicknesses, while by manipulation of the thumb-screws 62 I may adjust the device for wheels having rims of different breadths. The element 21 of the clamp being of spring material, when the clamp is once adjusted for a certain thickness of wheel the clamp may remain in this adjusted position for successive operations upon that wheel and upon other wheels having the same dimensions.

It will be understood that the specific form and arrangement herein shown and described may be varied without departing from the spirit of my invention, and in Fig. 2 of the drawings I have shown stops 75 and 76, carried by the table 9 and plate 13 and adapted to limit the movement of the latter in one direction.

Having thus described the invention, what is claimed is—

1. A nut-setting machine comprising a rotatable head having a plurality of nut-receiving passages, a seat adapted to receive said nuts successively, means for holding a threaded body adjacent said seat, means for pressing the nut into engagement with said body and means for rotating the seat.

2. A nut-setting machine comprising a rotatable head having a plurality of nut-receiving passages, a seat adapted for successive alinement with said passages to receive the nuts successively therefrom, means for holding a threaded body adjacent said seat, means for engaging the nut with the body, and means for rotating the seat to rotate the nut with respect to said body.

3. A nut-setting machine comprising a rotatable head having a plurality of nut-receiving passages, a central seat adapted for alinement with said passages successively to receive the nuts therefrom successively, means for holding a threaded body adjacent to the seat, a plunger operable in the seat and adapted to engage the nut and force it to said body, and means for rotating the seat to rotate the nut upon said body.

4. A nut-setting machine comprising a rotatable head having nut-receiving passages, a seat adapted to aline successively with said passages to receive the nuts therefrom, a clamp adjustable with respect to said seat and adapted to hold a body adjacent thereto, means for forcing a nut from the seat to the body, and means for rotating the seat to rotate the nut.

5. A nut-setting machine comprising a rotatable head having a plurality of nut-receiving passages, a seat adapted for successive alinement with said passages to receive the nuts successively therefrom, a plunger operable in the seat and adapted to engage the nut and force it along the seat and an adjustable clamp movable with respect to said seat and adapted to hold a threaded body to receive the nut from the plunger.

6. A nut-setting machine comprising a rotatable head having radial passages adapted to receive nuts, a sleeve upon which said head is rotatably mounted, a pawl-and-ratchet connection between the head and sleeve to permit rotation of the head in one direction only, a seat in said sleeve adapted to register with said passages successively as the head is rotated on the sleeve, means for rotating the sleeve, means for holding a threaded body adjacent the seat, and means for moving the nut along the seat and into engagement with the threaded body.

7. A nut-setting machine comprising a rotatable head having a plurality of nut-receiving passages, a seat adapted for successive alinement with said passages to receive the nuts therefrom, means operable in the seat and adapted to engage the nut therein and move it along the seat, and a clamp adjustable toward and laterally of said seat and comprising adjustable supports for a body to receive a nut.

8. A nut-setting machine comprising a nut-receiving head having radial passages adapted to receive nuts and mounted upon a sleeve having a seat and a communicating perforation adapted to aline with said passages successively to receive the nuts therefrom, a plunger movable longitudinally of said sleeve and in the seat to move the nuts in the latter, said head being rotatable with respect to the sleeve in one direction only, a pinion carried by the sleeve, means for rotating said pinion, a table adjacent the head, a slidable plate carried by the table and having adjustable supports thereon, a clamping element carried by said plate, a second clamping element slidably mounted upon said plate and adapted to clamp a body with respect to the first-named element, and means for operating said clamp.

In testimony that I claim the foregoing as my own I have hereto affixed my signature in the presence of two witnesses.

JAMES C. POE.

Witnesses:
GEORGE W. GOAD,
I. P. YOUNGBLOOD.